(12) United States Patent
Stirner

(10) Patent No.: US 9,688,003 B2
(45) Date of Patent: Jun. 27, 2017

(54) SCREW MACHINE AND METHOD AS WELL AS PROCESSING INSTALLATION FOR THE PROCESSING OF BULK MATERIAL

(71) Applicant: Coperion GmbH, Stutttgart (DE)

(72) Inventor: Thorsten Stirner, Königsbach-Stein (DE)

(73) Assignee: Coperion GmbH, Stuttgart (DE)

( * ) Notice: Subject to any disclaimer, the term of this patent is extended or adjusted under 35 U.S.C. 154(b) by 488 days.

(21) Appl. No.: 14/277,293

(22) Filed: May 14, 2014

(65) Prior Publication Data

US 2014/0338534 A1    Nov. 20, 2014

(30) Foreign Application Priority Data

May 15, 2013    (DE) .......................... 10 2013 208 993

(51) Int. Cl.
*B29C 47/76* (2006.01)
*B29B 7/84* (2006.01)
*B29B 7/48* (2006.01)
*B29C 47/08* (2006.01)
*B29C 47/10* (2006.01)

(52) U.S. Cl.
CPC .............. *B29B 7/845* (2013.01); *B29B 7/483* (2013.01); *B29C 47/083* (2013.01); *B29C 47/1027* (2013.01); *B29C 47/1081* (2013.01); *B29C 47/763* (2013.01); *B29C 47/767* (2013.01)

(58) Field of Classification Search
CPC ..... B29B 7/845; B29B 7/483; B29C 47/1081; B29C 47/0879; B29C 47/1027; B29C 47/083; B29C 47/0083

USPC ........ 366/79, 75, 83–85; 425/204, 208, 209; 95/266; 96/194
See application file for complete search history.

(56) References Cited

U.S. PATENT DOCUMENTS 3,371,379 A * 3/1968 Reifenhauser ...... B29C 44/0492
                                                    159/2.2
3,572,647 A * 3/1971 Staheli .................... B29C 47/38
                                                    366/75

(Continued)

FOREIGN PATENT DOCUMENTS

CN        2709035 Y      7/2005
CN      101143082 A      3/2008

(Continued)

*Primary Examiner* — Charles Cooley
(74) *Attorney, Agent, or Firm* — McGlew and Tuttle, P.C.

(57) ABSTRACT

A processing installation for the processing of bulk material has a vacuum filter insert for degassing of the bulk material. The vacuum filter insert is arranged in a casing of a screw machine downstream of the feed opening thereof and is provided with at least one filter element so that the vacuum filter insert forms a gas-permeable wall portion which defines the at least one casing bore of the screw machine. Seen in a degassing direction, a protective element comprising a plurality of through-openings is arranged upstream of the at least one filter element. The protective element acts as a granule protection for the at least one filter element and prevents granular bulk material from damaging the at least one filter element. As a result, the vacuum filter insert has a longer service life, thus ensuring a long operating time for the processing installation without interruptions.

19 Claims, 10 Drawing Sheets

(56) References Cited

U.S. PATENT DOCUMENTS

| | | | | |
|---|---|---|---|---|
| 4,130,901 | A | * | 12/1978 | Borovikova ............ B29C 47/10 366/139 |
| 4,260,264 | A | * | 4/1981 | Maki ..................... C02F 11/008 366/139 |
| 4,578,455 | A | * | 3/1986 | Pipper ................... B29C 47/763 264/102 |
| 6,367,960 | B2 | * | 4/2002 | Yamazaki ................. B01F 1/00 366/149 |
| 7,607,817 | B2 | * | 10/2009 | Samann ............. B29C 47/0011 366/75 |
| 8,360,627 | B2 | * | 1/2013 | Stirner ............... B01D 39/2041 366/75 |
| 8,992,068 | B2 | * | 3/2015 | Houk ..................... B29C 47/50 366/75 |
| 9,108,354 | B2 | * | 8/2015 | Houk ..................... B29C 47/50 |
| 2006/0034962 | A1 | * | 2/2006 | Guntherberg ......... B29C 47/761 425/208 |
| 2006/0349627 | | | 2/2006 | Guntherberg et al. |
| 2008/0248152 | A1 | * | 10/2008 | Samann ............. B29C 47/0011 425/208 |
| 2010/0202243 | A1 | * | 8/2010 | Stirner ............... B01D 39/2041 366/139 |
| 2010/0310700 | A1 | * | 12/2010 | Schulz ................ B29C 47/0871 425/209 |
| 2013/0020247 | A1 | * | 1/2013 | Samann ............. B29C 47/0815 210/232 |
| 2014/0338534 | A1 | * | 11/2014 | Stirner .................... B29B 7/483 95/266 |
| 2015/0239166 | A1 | * | 8/2015 | Heidemeyer ....... B29C 47/1045 406/53 |

FOREIGN PATENT DOCUMENTS

| | | | |
|---|---|---|---|
| CN | 101797795 A | | 8/2010 |
| CN | 201649014 U | | 11/2010 |
| CN | 202739909 U | | 2/2013 |
| DE | 20 2012 001 277 U1 | | 11/2012 |
| EP | 1 400 337 A1 | | 3/2004 |
| EP | 2 218 568 A1 | | 8/2010 |
| EP | 2218568 A1 | * | 8/2010 ........ B01D 39/2041 |
| JP | 09262830 A | * | 10/1997 |
| JP | 11245283 A | * | 9/1999 |
| JP | 11300811 A | * | 11/1999 |
| JP | 2002-210 805 A | | 7/2002 |
| JP | 2002210805 A | * | 7/2002 |
| JP | 2003071831 A | * | 3/2003 |
| JP | 2010184297 A | | 8/2010 |
| JP | 2010253804 A | * | 11/2010 |
| JP | 2011224862 A | * | 11/2011 |

\* cited by examiner ically to the invention that the at least one filter element is damaged and gradually destroyed

SCREW MACHINE AND METHOD AS WELL AS PROCESSING INSTALLATION FOR THE PROCESSING OF BULK MATERIAL

CROSS-REFERENCES TO RELATED APPLICATIONS

This application claims the priority of patent application Ser. No. DE 10 2013 208 993.7 filed on May 15, 2013, pursuant to 35 U.S.C. 119(a)-(d), the content of which is incorporated herein by reference in its entirety as if fully set forth herein.

FIELD OF THE INVENTION

The invention relates to a screw machine comprising a casing; at least one casing bore formed in the casing; at least one shaft which is drivable for rotation about an associated axis of rotation and which is arranged in the associated casing bore; at least one treatment element for the treatment of a bulk material to be processed which is non-rotationally arranged on the at least one shaft; a feed opening for feeding the bulk material into the at least one casing bore; and a vacuum filter insert for degassing of the supplied bulk material, wherein the vacuum filter insert is arranged in the casing downstream of the feed opening when seen in a direction of conveyance; is provided with at least one filter element; and forms a gas-permeable wall portion which defines the at least one casing bore. The invention further relates to a method for the processing of bulk material and to a processing installation for the processing of bulk material comprising a screw machine comprising a casing; at least one casing bore formed in the casing; at least one shaft which is drivable for rotation about an associated axis of rotation and which is arranged in the associated casing bore; at least one treatment element for the treatment of a bulk material to be processed which is non-rotationally arranged on the at least one shaft; a feed opening for feeding the bulk material into the at least one casing bore; and a vacuum filter insert for degassing of the supplied bulk material, wherein the vacuum filter insert is arranged in the casing downstream of the feed opening when seen in a direction of conveyance; is provided with at least one filter element; and forms a gas-permeable wall portion which defines the at least one casing bore; a drive device for rotatably driving the screw machine; a vacuum generation device for degassing the bulk material via the vacuum filter insert; a flushing device for cleaning the vacuum filter insert; and a control device.

BACKGROUND OF THE INVENTION

From US 2010/0202243A1, a screw machine is known which has a vacuum filter insert for the feeding and treatment of bulk material which al-lows the bulk material to be degassed when a vacuum is applied thereto. This allows a powdery bulk material to be easily fed to the screw machine. In order to prevent bulk material from being discharged from the screw machine via the vacuum filter insert, the vacuum filter insert is provided with a filter element in the form of a metal nonwoven. A drawback is that the filter element only has a limited service life and needs to be replaced as soon as the service life has expired which results in unwanted downtimes for the screw machine.

SUMMARY OF THE INVENTION

It is the object of the invention to provide a screw machine for the feeding and processing of bulk material which is provided with a vacuum filter insert that has a comparatively long service life.

This object is achieved by a screw machine comprising a casing; at least one casing bore formed in the casing; at least one shaft which is drivable for rotation about an associated axis of rotation and which is arranged in the associated casing bore; at least one treatment element for the treatment of a bulk material to be processed which is non-rotationally arranged on the at least one shaft; a feed opening for feeding the bulk material into the at least one casing bore; and a vacuum filter insert for degassing of the supplied bulk material, wherein the vacuum filter insert is arranged in the casing downstream of the feed opening when seen in a direction of conveyance; is provided with at least one filter element; and forms a gas-permeable wall portion which defines the at least one casing bore, wherein a protective element comprising through-openings is arranged upstream of the at least one filter element when seen in a degassing direction. It was found according to the invention that the at least one filter element is damaged and gradually destroyed by the granular and/or powdery bulk material. In particular the comparatively large bulk material particles of granular bulk material have a high kinetic energy when supplied to the screw machine which is at least partly transferred to the at least one filter element when hitting said filter element. In order to protect the at least one filter element, a protective element is arranged upstream thereof in the degassing direction which protects the at least one filter element from incident bulk material particles but has a plurality of through-openings allowing the bulk material to be degassed in the usual manner. The protective element has a wall thickness in the degassing direction in the range of between 0.5 mm and 8 mm, in particular between 0.8 mm and 6 mm, and in particular between 1 mm and 4 mm. Therefore, the protective element in particular acts as a granule protector. The protective element is preferably made of metal.

The through-openings are configured in such a way as to prevent bulk material having a predefined particle size or more, in particular granular bulk material, from passing through the through-openings and reaching the at least one filter element. Preferably, the through openings have a minimum size of no more than 2 mm, in particular of no more than 1.5 mm, and in particular of no more than 1 mm.

In order to support the at least one filter element, the vacuum filter insert is preferably provided with a support fabric and/or a drain fabric which is arranged downstream of the at least one filter element in the degassing direction. The support fabric has a mesh width in the range of 100 μm to 400 μm while the drain fabric has a mesh width in the range of 500 μm to 1000 μm. Generally speaking, the support fabric therefore has a finer mesh width than the drain fabric. In contrast, the at least one filter element has a filter fineness of 1 μm to 10 μm according to ISO 16889.

The granular bulk material is preferably a granular plastic material. The granular bulk material is mixed with a powdery bulk material. The powdery bulk material is in particular in the form of fillers and/or additives.

The screw machine according to the invention is used for the feeding and/or processing of bulk material. The screw machine is for instance configured as a side loading machine used for supplying bulk material to another screw machine for processing of the bulk material. The side loading machine is therefore required for intake and metering of the bulk material. Moreover, the screw machine according to the invention is for instance configured for the processing of bulk material and is in particular provided with a number of treatment elements such as screw and/or kneading elements for treatment of the bulk material to be processed which are non-rotationally arranged one behind the other along the at least one shaft in the direction of the respective axis of rotation.

The protective element has a cross-section which is partly in the shape of a segment of a circular arc so as to be adapted to the at least one casing bore. This ensures a long service life of the vacuum filter insert. The cross-sectional shape of the protective element, which is adapted to the at least one casing bore, allows the bulk material to be easily and reliably wiped off the protective element in the operation of the screw machine by means of a treatment element. Bulk material particles adhering to the protective element are therefore continuously carried away by the treatment element, with the result that the protective element is cleaned continuously.

A screw machine in which the through-openings are configured in the shape of an elongated hole ensures a long service life of the vacuum filter insert combined with a high filter performance thereof. The through-openings are in the shape of an elongated hole and therefore have a comparatively small minimum size or width on the one hand preventing bulk material particles exceeding the minimum size from passing through the through-openings to the at least one filter element. On the other hand, the elongated shape of the through-openings provides for a large free filter area which ensures that the filter performance is virtually not impaired, thus allowing the bulk material to be degassed effectively. The elongated through-openings preferably have a width of no more than 2 mm, in particular of no more than 1.5 mm, and in particular of no more than 1 mm, and a length of 5 mm to 100 mm, in particular of 10 mm to 80 mm, and in particular of 15 mm to 50 mm.

A screw machine in which the through-openings have a length L and a width B to which applies $2 \leq L/B \leq 100$, in particular $5 \leq L/B \leq 80$, and in particular $10 \leq L/B \leq 40$ ensures a long service life of the vacuum filter insert combined with a high filter performance thereof. The length-to-width ratio of the through-openings ensures that despite a comparatively large free filter area, the protective element has a sufficient intrinsic stability to keep the bulk material particles hitting the protective element with high kinetic energy away from the at least one filter element while preventing damages to itself. In this regard, the minimum width of the through-openings is selected such that bulk material particles having a predefined particle size or more are not able to pass through the through openings.

A screw machine in which the through-openings are arranged in rows, in particular in such a way that their respective central longitudinal axes are aligned with respect to each other in such a way as to form a row ensures a long service life of the vacuum filter insert combined with a high filter performance thereof. The through-openings are arranged in rows, thus ensuring a high mechanical intrinsic stability of the protective element despite a large free filter area. The respective central longitudinal axis M is preferably parallel to the at least one axis of rotation.

A screw machine in which the through-openings of adjacent rows are arranged in a staggered pattern ensures a high reliability of the vacuum filter insert. The staggered arrangement of the through-openings results in a high mechanical intrinsic stability of the protective element combined with a large free filter area thereof. The through-openings of adjacent rows are preferably arranged in a half-staggered pattern.

A screw machine in which in each case two adjacent through-openings have a distance A from each other, wherein the ratio of the distance A to a width B of the through-openings is such that $0.1 \leq A/B \leq 2$, in particular $0.2 \leq A/B \leq 1.5$, and in particular $0.4 \leq A/B \leq 1$ ensures a high reliability of the vacuum filter insert. The distance-to-width ratio of adjacent through-openings ensures that a sufficiently wide web remains between adjacent through openings to ensure a sufficient mechanical intrinsic stability for the protective element. Preferably, the webs have a wall thickness of 0.5 mm to 4 mm, in particular of 0.5 mm to 2 mm, and in particular of 0.5 mm to 1 mm.

A screw machine in which the protective element has at least two separate protective areas comprising through-openings, wherein the vacuum filter insert in particular has a filter element for each protective area ensures a long service life of the vacuum filter insert. The protective element has at least two, in particular at least four separate protective areas with associated through-openings, thus allowing each protective area as well as the associated filter area to be cleaned independently of another protective area by means of compressed gas or compressed air. The separate protective areas are in particular separated from each other by an associated gas-impermeable separation area. By virtue of the fact that the protective element and the at least one filter element are cleaned area by area, in other words successively, thus ensuring that the operation of the screw machine does not have to be interrupted since the screw machine can be cleaned successively while the screw machine is in operation. Furthermore, the gas-impermeable separation area increases the mechanical intrinsic stability of the protective element.

The preferably separate filter elements can be replaced and/or cleaned separately as required. Together with the associated protective area, the filter elements can be cleaned separately from each other by means of a compressed gas or compressed air, allowing adhering bulk material particles to be removed from the respective filter element at regular time intervals without requiring the operation of the screw machine to be stopped.

A screw machine in which each protective area is assigned to a central channel, wherein in particular each central channel is connected to an associated distribution channel, ensures a long service life of the vacuum filter insert. Each protective area is associated to a corresponding central channel for the supply of gas or compressed air, allowing the protective areas as well as the associated filter areas or filter elements to be selected both individually and together, thus for instance allowing the vacuum filter insert to be cleaned successively and to flush the entire vacuum filter insert as a preventive measure while the screw machine is at standstill. As a result, the protective element and the at least one filter element is protected from impurities. The distribution channels on the one hand ensure a constant vacuum generation and a constant supply of gas or compressed air on the other.

A screw machine in which said screw machine has at least two interpenetrating casing bores, which are configured in such a way as to be parallel to each other, and associated shafts comprising closely intermeshing treatment elements; and in which the protective element has a cross-section which is partially in the shape of two adjacent segments of a circular arc so as to be adapted to the at least two casing bores ensures a long service life of the vacuum filter insert combined with a high throughput of the screw machine. The screw machine has at least two parallel and interpenetrating casing bores with associated shafts and treatment elements arranged thereon, thus providing for a high throughput of the screw machine. In order to achieve a correspondingly high throughput of bulk material, the vacuum filter insert has a cross-section in the shape of two adjacent segments of a circular arc so that the protective element is adapted to the cross-sectional shape of the casing bores. The treatment elements arranged on the shafts wipe the protective element in the region of a respective segment of a circular arc, causing bulk material particles adhering to the protective element to be carried away continuously so that the protective element is cleaned continuously. As a result, a high filter performance is achieved, with the protective element at the same time protecting the at least one filter element from being damaged by bulk material particles.

Another object of the invention is to provide a reliable and efficient method for the processing of bulk material.

This object is achieved by a method for the processing of bulk materials comprising the following steps: providing a screw machine comprising a casing; at least one casing bore formed in the casing; at least one shaft which is drivable for rotation about an associated axis of rotation and which is arranged in the associated casing bore; at least one treatment element for the treatment of a bulk material to be processed which is non-rotationally arranged on the at least one shaft; a feed opening for feeding the bulk material into the at least one casing bore; and a vacuum filter insert for degassing of the supplied bulk material, wherein the vacuum filter insert is arranged in the casing downstream of the feed opening when seen in a direction of conveyance; is provided with at least one filter element; and forms a gas-permeable wall portion which defines the at least one casing bore; supplying bulk material, in particular granular and/or powdery bulk material to the at least one casing bore via the feed opening; degassing the bulk material via the vacuum filter insert wherein the vacuum filter insert is flushed with a compressed gas, in particular compressed air, when the screw machine is at standstill; and processing the bulk material. The vacuum filter insert is flushed while the screw machine is at standstill, thus effectively preventing the at least one filter element from being damaged and/or clogged. The at least one filter element is preventively and in particular flushed in its entire filter area while the screw machine is at stand-still. When the screw machine is at standstill, the compressed air or compressed gas, respectively, flowing through the at least one filter element in a direction opposite to the degassing direction prevents hot gas from leaking out of the screw machine to the surface of the at least one filter element where it would cause bulk material particles adhering to the at least one filter element to melt, causing them to clog or irreversibly clog the at least one filter element which would then be damaged permanently. The permanent or preventive flushing of the vacuum filter insert while the screw machine is at standstill prevents the at least one filter element from being damaged and/or clogged, thus resulting in an increased service life of the vacuum filter insert. The method according to the invention is thus reliable and efficient. During flushing, the volumetric flow rate may be adjusted as required.

Flushing is in particular carried out during an emergency stop of the screw machine or in the course of a regularly scheduled stop of the screw machine. The screw machine is for instance configured as a side loading machine which feeds bulk material to a screw machine for further processing. Alternatively, the screw machine is configured for feeding and processing of the bulk material.

In addition thereto, the vacuum filter insert may be cooled by means of a water cooling system and/or an air cooling system in the operation of the screw machine. For air cooling, the vacuum filter insert is for instance flushed in its entire filter area. Activation of the air cooling system may for instance be coupled with the water cooling system and may be triggered simultaneously or consecutively.

The method according to the invention may in particular also be further developed such as to have the features of the screw machine according to the invention.

A method in which flushing is activated when a predefined lower speed limit of the at least one shaft is reached ensures a high reliability since the at least one filter element is effectively prevented from being clogged in such a way that the flushing procedure is activated when required and/or as a function of the bulk material. As soon as the predefined lower speed limit $n_U$ is reached or the speed value falls below said lower speed limit $n_U$, flushing is activated immediately or with a delay. The delay may be set as a function of the bulk material or product and/or process.

A method in which flushing is deactivated when a predefined upper speed limit of the at least one shaft is reached ensures a high efficiency. Flushing of the at least one filter element is deactivated as soon as the upper speed limit $n_O$ is reached or exceeded, thus allowing the vacuum filter insert to be operated again in the manner and for the purpose intended. In other words, processing of the bulk material may then be resumed again.

A method in which flushing is deactivated when a predefined lower temperature limit of the casing is reached ensures a high reliability in the event of long machine downtimes. In the event of a permanent machine downtime, flushing is deactivated as soon as the casing has reached the lower temperature limit $T_U$ or the temperature thereof falls below said lower temperature limit $T_U$. The lower temperature limit $T_U$ for instance amounts to 100° C., in particular 80° C., and in particular 40° C. The lower temperature limit is for instance set as a function of the respective bulk material or product. As a result, permanent flushing is deactivated when the vacuum filter insert and the at least one filter element are no longer exposed to the risk of being clogged or damaged. The flushing device used for flushing is thus protected. Flushing may be reactivated when the casing temperature has reached or exceeded an upper temperature limit $T_O$. The upper temperature limit $T_O$ may again be set as a function of the respective bulk material or product. The upper temperature limit $T_O$ for instance amounts to 40° C., and in particular 80° C.

A method in which the vacuum filter insert is flushed area by area for cleaning purposes by means of a compressed gas, in particular compressed air, ensures a high reliability and efficiency when processing bulk material. The vacuum filter insert is flushed successively using a gas or compressed air, thus allowing the vacuum filter insert to be cleaned successively without having to stop the screw machine. The areas of the vacuum filter insert are preferably cleaned successively and/or at regular intervals during operation. Successive cleaning is preferably activated at a constant throughput in the operation of the screw machine. In order to activate successive cleaning, the vacuum applied to the vacuum filter insert is for instance monitored by means of a pressure sensor which causes cleaning to be activated as soon as a predefined threshold value is reached. For instance, each filter area may be provided with its own pressure measuring device allowing the respective filter area to be flushed or cleaned by means of a pressure pulse as soon as a measured value falls below a threshold value. The filter areas may therefore be cleaned when required. It is conceivable as well to monitor all filter areas by means of one pressure measuring device. As soon as a predefined threshold value is reached, a successive cleaning of the individual filter areas is activated according to a predefined sequence. For instance, the filter areas are cleaned successively at a time interval of 30 seconds.

Preferably, at least one flow meter is provided which measures the volume of the gas or compressed air during successive cleaning or preventive flushing. This allows the cleaning or preventive flushing process to be optimized.

Moreover, successive cleaning may be carried out at predefined time intervals without requiring a pressure measuring device. The individual filter areas may for instance be cleaned successively at a time interval of 10 minutes. If for instance four filter areas are provided, each filter area is cleaned at a regular time interval of 40 minutes during operation. The time interval may be selected as a function of the respective bulk material or product and/or process.

For cleaning, the duration of the respective pressure pulse is selected such that the filter cake is detached from the at least one filter element using an amount of gas or compressed air that is as small as possible. The compressed air pulse generated for cleaning preferably has a duration of no more than 2 seconds, in particular of no more than 1 second, and in particular of no more than 0.5 seconds. The pressure of the gas or compressed air during successive cleaning and/or preventive flushing preferably amounts to no more than 4.5 bar, in particular no more than 3.0 bar, in particular no more than 1.5 bar, in particular no more than 1.0 bar, and in particular no more than 0.5 bar above ambient pressure. Pressure is preferably selected such as to prevent the at least one filter element from blowing up and coming into contact with a treatment element while ensuring that the amount of gas or compressed air interfering with the process is kept to a minimum.

On the other hand, the amount of pressure is selected such as to ensure a reliable cleaning or flushing. If the vacuum filter insert is provided with a protective element, then the pressure required for successive cleaning or preventive flushing may be set to a comparatively higher value.

A method in which a protective element comprising through-openings is arranged upstream of the at least one filter element when seen in a degassing direction which protects the at least one filter element from damages caused by the bulk material during degassing ensures a high reliability. The pressure element prevents damages to the at least one filter element.

Another object of the invention is to provide a processing installation for the processing of bulk material which ensures a high reliability at reduced downtimes.

This object is achieved by a processing installation for the processing of bulk material, the processing installation comprising a screw machine comprising a casing; at least one casing bore formed in the casing; at least one shaft which is drivable for rotation about an associated axis of rotation and which is arranged in the associated casing bore; at least one treatment element for the treatment of a bulk material to be processed which is non-rotationally arranged on the at least one shaft; a feed opening for feeding the bulk material into the at least one casing bore; and a vacuum filter insert for degassing of the supplied bulk material, wherein the vacuum filter insert is arranged in the casing downstream of the feed opening when seen in a direction of conveyance; is provided with at least one filter element; and forms a gas-permeable wall portion which defines the at least one casing bore; a drive device for rotatably driving the screw machine; a vacuum generation device for degassing the bulk material via the vacuum filter insert; a flushing device for cleaning the vacuum filter insert; and a control device, wherein a protective element comprising through-openings is arranged upstream of the at least one filter element when seen in a degassing direction, and/or wherein the control device is configured in such a way that the vacuum filter insert is flushed with a compressed gas, in particular compressed air, when the screw machine is at a standstill. The advantages of the processing installation according to the invention correspond to the advantages of the screw machine according to the invention and/or of the method according to the invention already described above. The processing installation according to the invention may in particular be further developed such as to have the features according to the invention.

The vacuum generation device is used for degassing bulk material in the usual manner. Thanks to the protective element, the vacuum filter insert has a long service life since the at least one filter element is effectively protected from damages caused by the bulk material. The flushing device allows the vacuum filter insert to be cleaned using compressed gas or compressed air. Thanks to the design of the control device, the flushing device in particular allows a preventive flushing of the vacuum filter insert to be carried out when the screw machine is at standstill.

Further features, advantages and details of the invention will be apparent from the ensuing description of a number of exemplary embodiments.

DESCRIPTION OF THE PREFERRED EMBODIMENT

Figure 1:
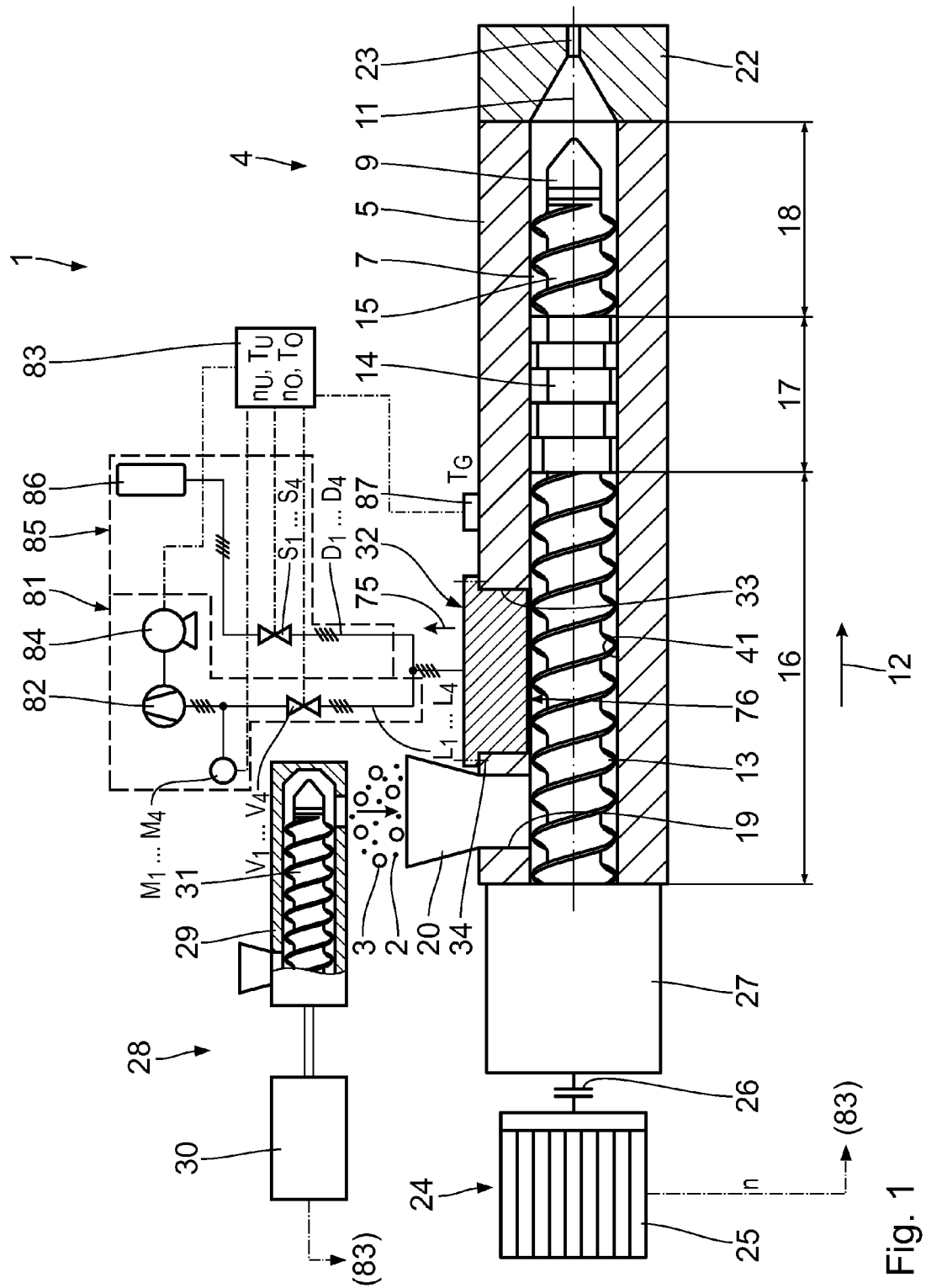
FIG. 1 shows a processing installation for the processing of bulk material according to a first exemplary embodiment, with a screw machine thereof being shown in a longitudinal sectional view.
Figure 2:
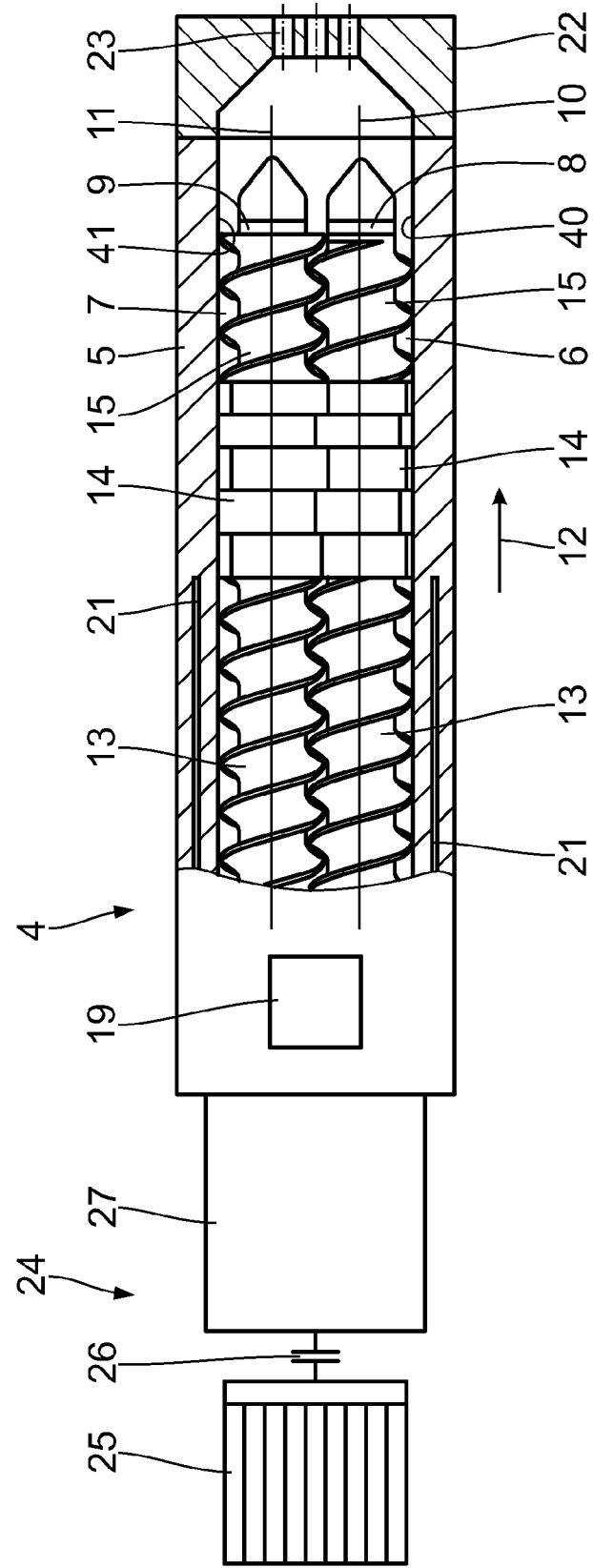
FIG. 2 shows a horizontal longitudinal sectional view of the screw machine according to the present invention.
Figure 3:
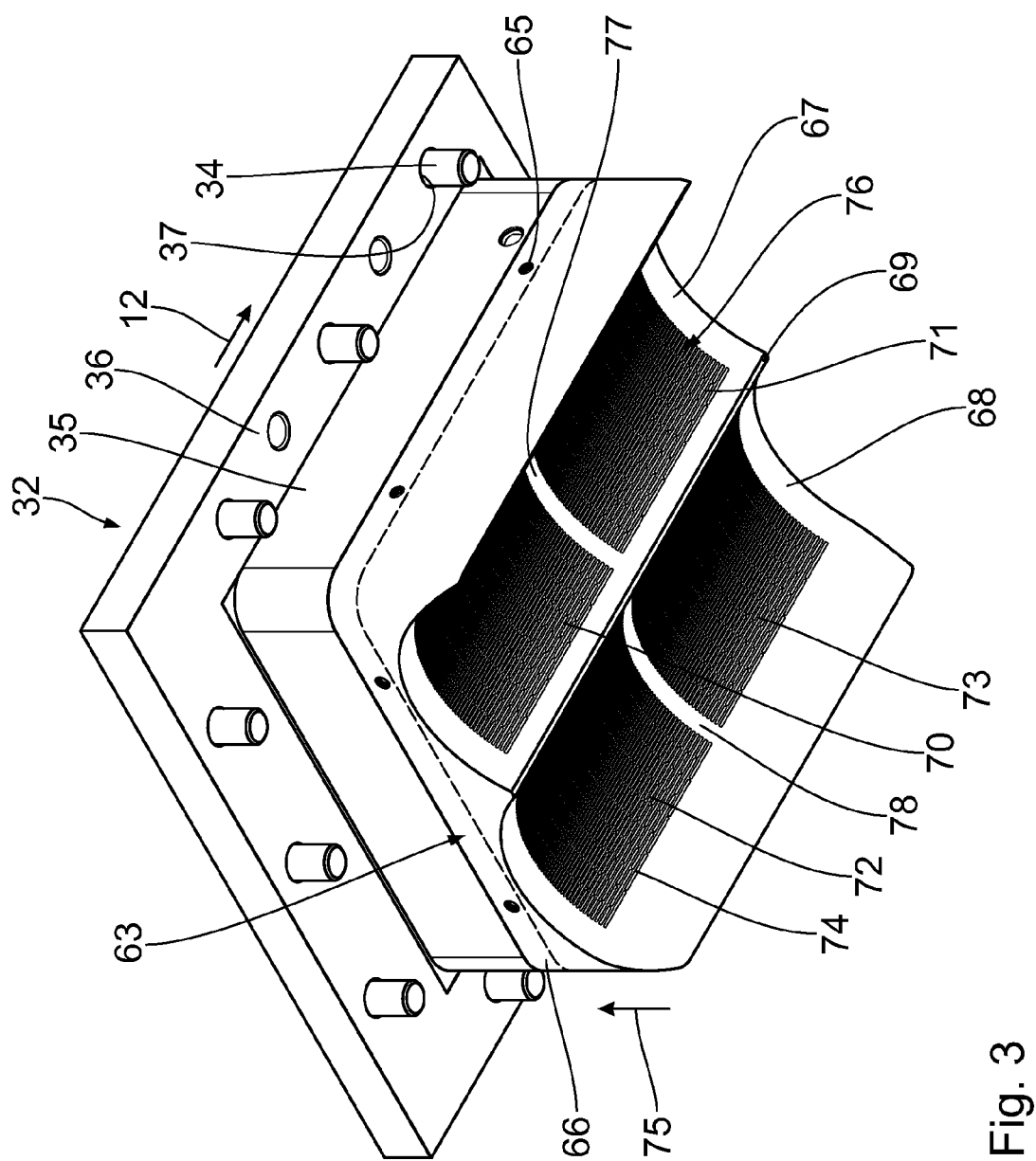
FIG. 3 shows a perspective view of a vacuum filter insert of the screw machine according to FIG. 1.
Figure 4:
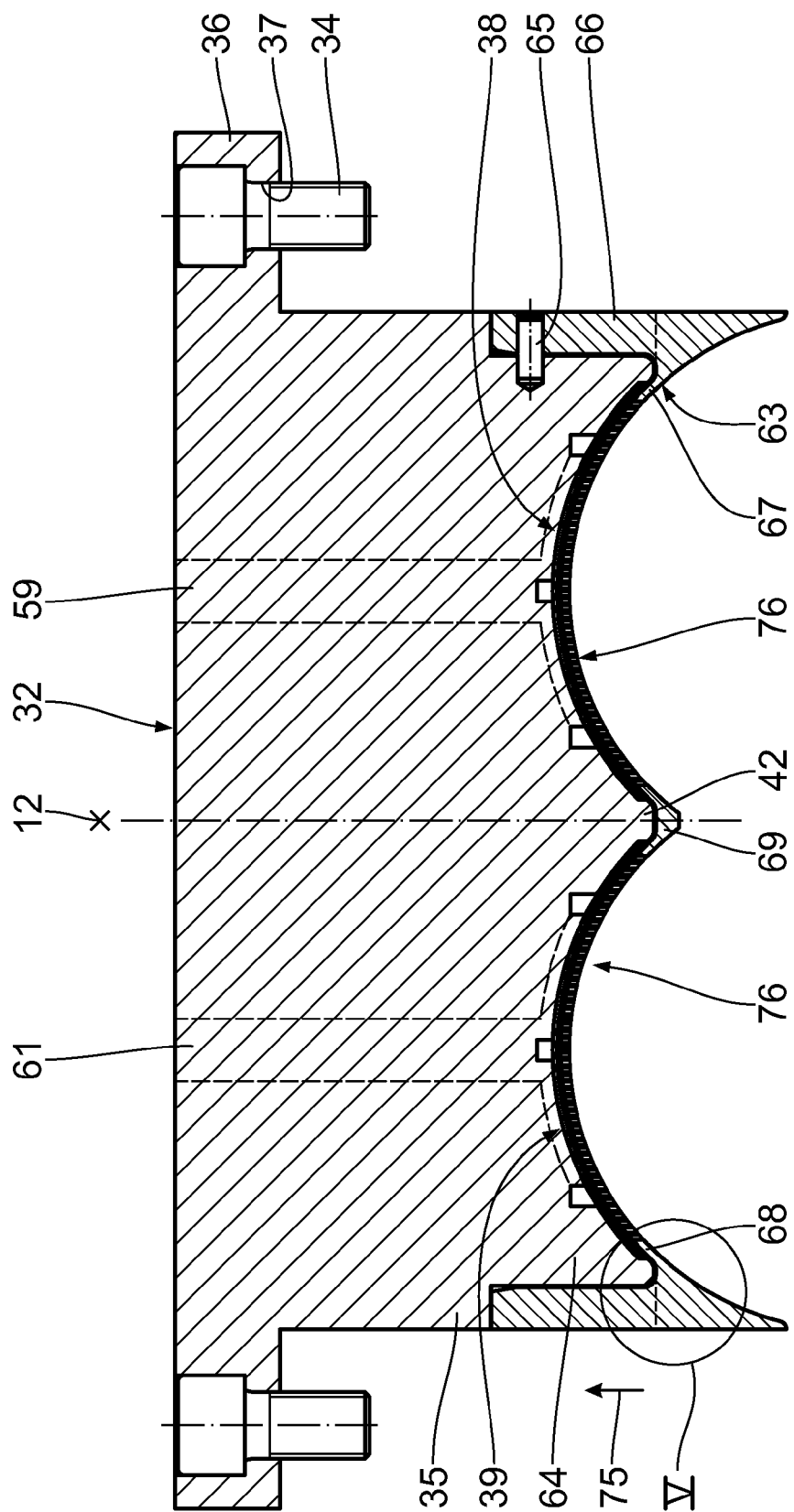
FIG. 4 shows a vertical cross-section through the vacuum filter insert according to FIG. 3.
Figure 5:
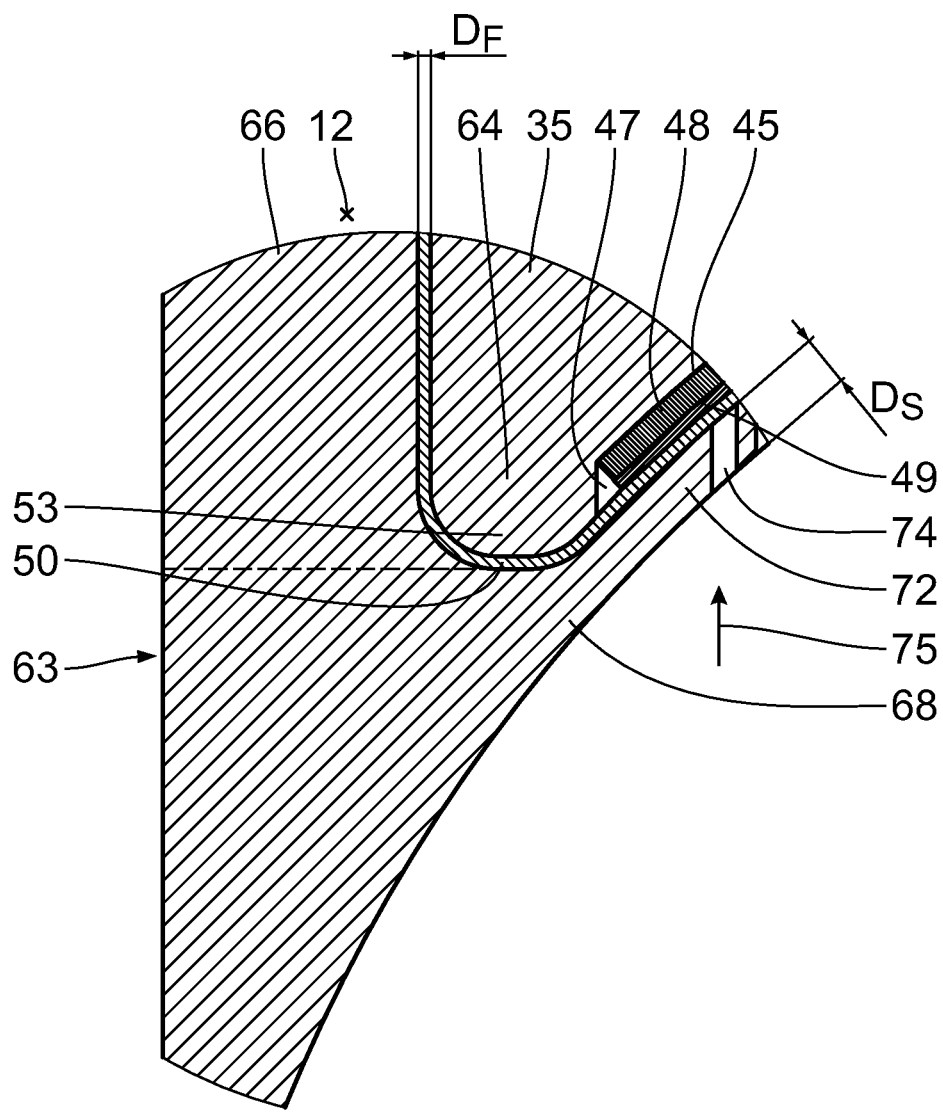
FIG. 5 shows an enlarged view of the vacuum filter insert in FIG. 4 in the region V of a protective element.
Figure 6:
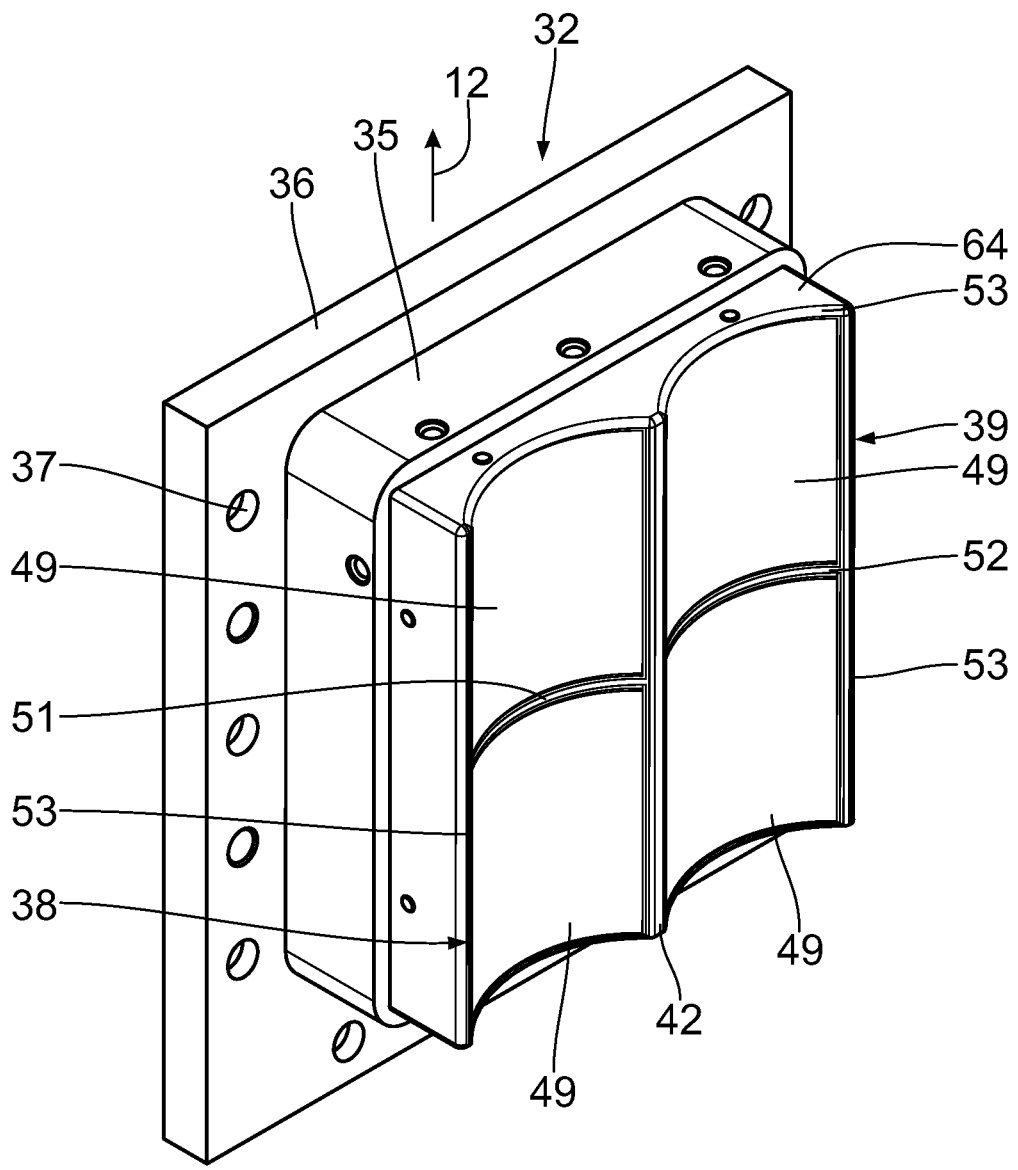
FIG. 6 shows a perspective view of the vacuum filter insert without the protective element.
Figure 7:
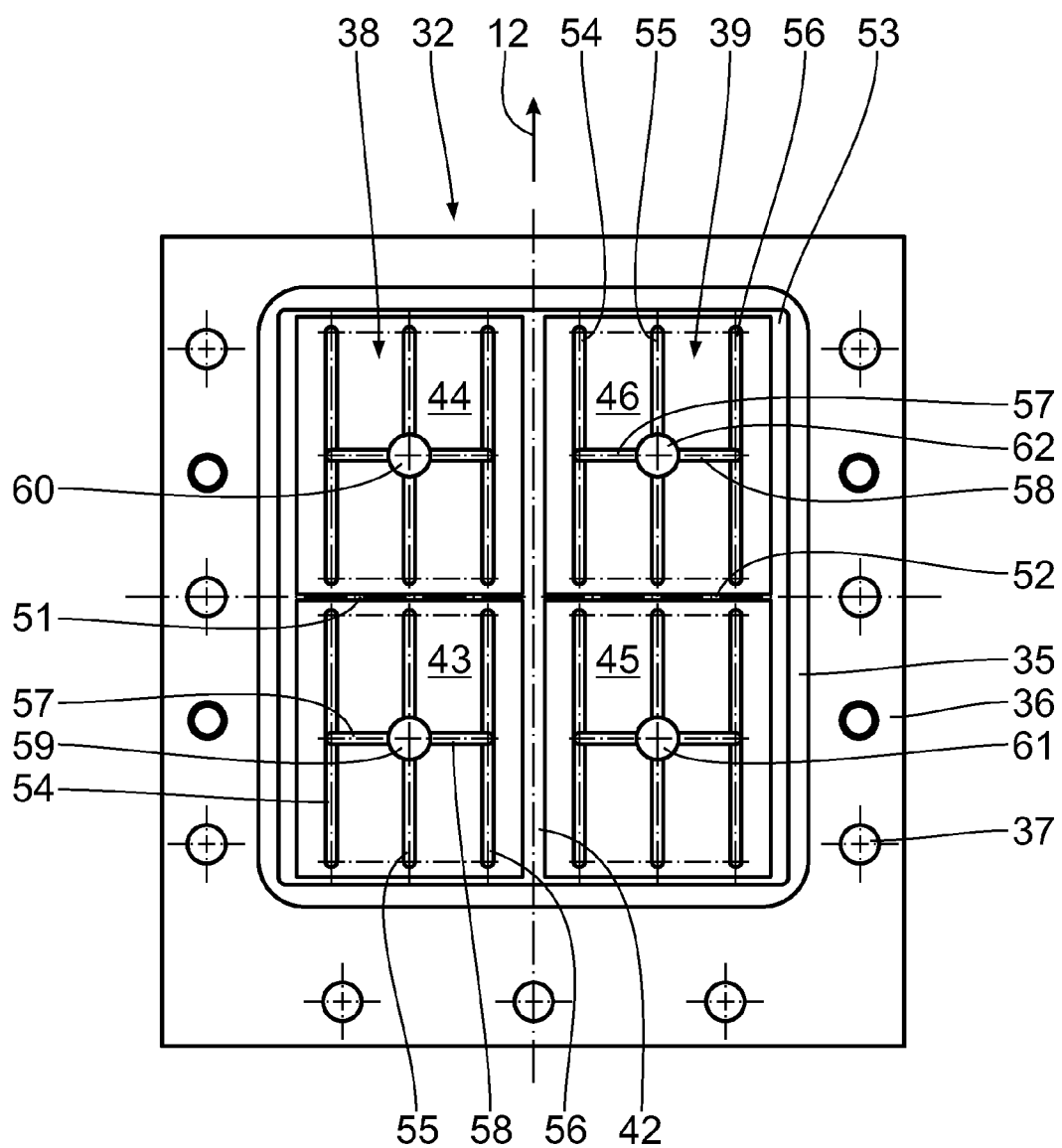
FIG. 7 shows a plan view of the vacuum filter insert in FIG. 6 without filter elements.
Figure 8:
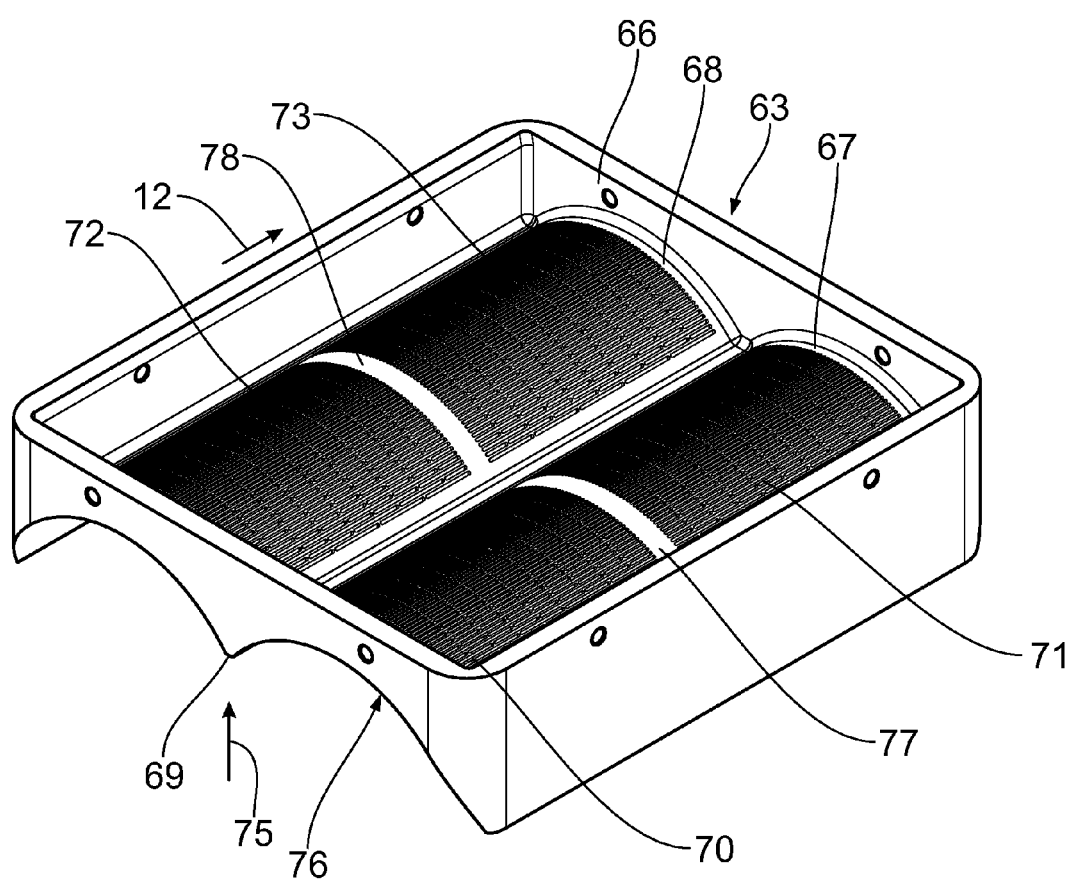
FIG. 8 shows a perspective view of the protective element in FIG. 3.

The following description refers to a first exemplary embodiment of the invention which is described with reference to FIGS. 1 to 9. The processing installation 1 shown in FIG. 1 is used for the processing of a mixture of powdery bulk material 2 and granular bulk material 3. The processing installation 1 has a screw machine 4 in the form of an extruder the casing 5 of which is assembled from a number of casing sections not shown in more detail. In the casing 5, two interpenetrating casing bores 6, 7 are formed which are parallel to each other. In the casing bores 6, 7, two shafts 8, 9 are arranged concentrically for rotation about corresponding axes of rotation 10, 11. The shafts 8, 9 are provided with a number of treatment elements 13, 14, 15 which are in each case arranged one behind the other in a direction of conveyance 12. The treatment elements 13, 14, 15 arranged next to one another on the shafts 8, 9 are configured such as to form closely intermeshing pairs.

The screw machine 4 has an inlet zone 16, a melting and processing zone 17, and a pressure build-up zone 18 which are arranged one behind the other in the direction of conveyance 12. In the inlet zone 16, the screw machine 4 has a feed opening 19 comprising an associated feed hopper 20 for feeding the bulk material 2, 3. The feed opening 19 opens into the inlet zone 16 in which treatment elements in the form of first conveyor screw elements 13 are arranged on the shafts 8, 9. In the region of the inlet zone 16, cooling channels 21 are formed in the casing 5.

In the melting and processing zone 17 arranged downstream of the inlet zone 16, treatment elements in the form of kneading disks 14 are arranged on the shafts 8, 9. The downstream pressure build-up zone 18 is defined by treatment elements in the form of second conveyor screw elements 15. The end of the casing 5 is sealed by means of a nozzle plate 22 comprising outlet nozzles 23.

A drive device 24 is provided for driving the shafts 8, 9. The drive device 24 comprises an electric drive motor 25 which is coupled to a reduction and distribution gear 27 via a clutch 26. The drive device 24 allows the shafts 8, 9 to be driven for rotation in the same direction. The shafts 8, 9 are coupled to the gear 27 in the usual manner.

A metering device 28 is provided for feeding the bulk material 2, 3 to the screw machine 4, the metering device 28 being provided with a gravimetric metering screw 31 which is drivable for rotation in a casing 29 by means of a drive motor 30.

For feeding and degassing of the bulk material 2, 3, the screw machine 4 is provided with a vacuum filter insert 32 which is arranged in the inlet zone 16 downstream of the feed opening 19 when seen in the direction of conveyance 12. To this end, the casing 5 has a receiving opening 33 which reaches up to casing bores 6, 7. In the receiving opening 33, the vacuum filter insert 32 is detachably arranged by means of screws 34.

The vacuum filter insert 32 has a block-shaped base body 35 which is provided with a peripheral flange 36 on a side remote from the casing bores 6, 7. In the flange 36, a plurality of holes 37 are arranged through which the screws 34 are screwable into the casing 5. On a side remote from the flange 36, the base body 35 is provided with two partially cylindrical contact surfaces 38, 39 which substantially correspond to the curvature of the inner walls 40, 41 of the casing bores 6, 7 and form a gusset 42 at their point of penetration. Seen in the direction of conveyance 12, the contact surfaces 38, 39 form in each case two filter areas 43, 44 and 45, 46 which are arranged one behind the other. The filter areas 43 to 46 are in each case set back with respect to the respective contact surface 38, 39 so that each filter area 43 to 46 forms a respective receptacle 47 for a corresponding drain fabric 48 and a support fabric 49 arranged thereon. The filter areas 43 to 46 are separated from each other by raised separation areas 51, 52 when seen in the direction of conveyance and by the gusset 42 when seen in a direction transverse to the direction of conveyance 12, and they are surrounded by a raised edge area 53. The support fabrics 49 carry at least one filter element 50. For instance, a single filter element 50 may be provided which covers all filter areas 43 to 46. Alternatively, two filter elements may be provided for in each case two filter areas 43, 44 and 45, 46 or 43, 45 and 44, 46. Alternatively, four filter elements 50 may be provided for in each case one of the filter areas 43 to 46.

Each of the filter areas 43 to 46 is provided with three longitudinal channels 54 to 56 running parallel to each other in the direction of conveyance 12 which are connected to each other by two cross-channels 57, 58 and to a respective central channel 59 to 62. The channels 54 to 48 form distribution channels. The central channels 59 to 62 break through the base body 35 and open into the respective receiving space of the each of the filter areas 43 to 46 so that the filter areas 43 to 46 are connected to the corresponding longitudinal and cross channels 54 to 58.

The corresponding drain fabrics 48 and support fabrics 49 of each of the filter areas 43 to 46 are covered by the at least one filter element 50. In order to protect the at least one filter element 50 from being damaged by the granular bulk material 3, the vacuum filter insert 32 is provided with a protective element 63. An end area 64 of the base body 35 facing the at least one filter element 50 is configured such as to form a recess. Configured as an attachment, the protective element 63 is attached to the end area 64 of the base body 35 and is fastened to the base body 35 by means of fastening screws 65. To this end, the protective element 63 is provided with a frame 66 which comprises two partially cylindrical protective walls 67, 68 arranged on the frame 66 in such a way as to form one piece. The protective walls 67, 68 have a cross-section in the shape of segments of a circular arc and are curved such as to correspond to the inner walls 40, 41 so that the inner walls 40, 41 and the protective walls 67, 68 are flush with each other. In the penetration area, the protective walls 67, 68 form a gusset 69 which is flush and in line with the gusset formed by the casing bores 6, 7. The at least one filter element 50 is clamped between the base body 35 and the attached protective element 63 in the region of the gusset 42, the separation areas 51, 52 and the edge area 53.

Corresponding to the filter areas 43 to 46, the protective walls 67, 68 form in each case two protective areas 70, 73 which are arranged one behind the other in the direction of conveyance 12 and are arranged in the protective walls 67, 68 such as to correspond to the filter areas 43 to 46. Each of the protective areas 70 to 73 has a plurality of through-openings 74. The protective element 63 is arranged upstream of the at least one filter element 50 when seen in a degassing direction 75 and is therefore protected from damages caused by the granular bulk material 3. Thanks to the through-openings 74, the at least one gas-permeable filter element 50, the longitudinal channels and cross-channels 54 to 58 as well as the central channels 59 to 62, the vacuum filter insert 32 forms a gas-permeable wall portion 76 which defines the casing bores 6, 7. The protective areas 70 to 73 are bounded by gas-impermeable separation areas 77, 78 in the direction of conveyance 12 and by the gusset 69 in a direction transverse to the direction of conveyance 12. Moreover, the protective areas 70 to 73 are bounded by the frame 66. The separation areas 77, 78 as well as the gusset 69 of the protective element 63 are arranged such as to correspond to the separation areas 51, 52 and the gusset 42 of the base body 35, thus ensuring that the drain fabrics 48 and support fabrics 49 are securely retained in the respective receiving space 47 and the at least one filter element is securely fastened.

Figure 9:
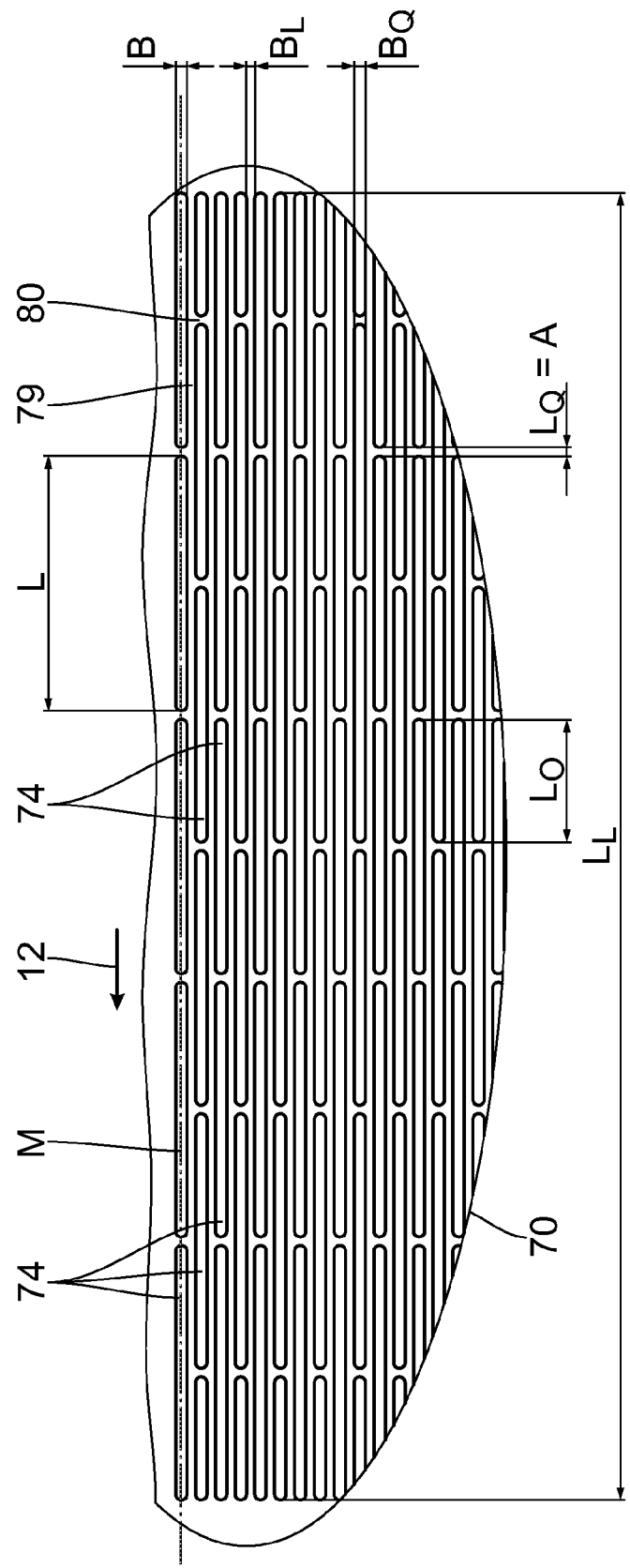
FIG. 9 shows an enlarged plan view of the protective element in FIG. 8 in the region of through-openings.

The following description refers to the through-openings 74 of the protective area 70 which are described in detail with reference to FIG. 9. The through-openings 74 of the protective areas 71 to 73 are identical thereto.

The through-openings 74 are in the shape of an elongated hole and have a length L in the direction of conveyance 12 and a width B in the direction transverse to the direction of conveyance 12. The length-to-width ratio L/B is such that $2 \leq L/B \leq 100$, in particular $5 \leq L/B \leq 80$, and in particular $10 \leq L/B \leq 40$. Preferably, the through-openings 74 have a minimum width of no more than 2 mm, in particular of no more than 1.5 mm, and in particular of no more than 1 mm. Furthermore, the through-openings 74 preferably have a length L in the range of 5 mm to 100 mm, in particular in the range of 10 mm to 80 mm, and in particular in the range of 15 mm to 50 mm. The respective central longitudinal axes M of each of the through-openings 74 are aligned to each other in such a way that the through-openings 74 form a plurality of adjacent rows. The central longitudinal axes M run parallel to the direction of conveyance 12. The through-openings 74 of adjacent rows are staggered with respect to each other. The through-openings 74 of adjacent rows are in particular arranged in a half-staggered pattern such that the through-openings 74 of a first row are in each case centred with respect to two through-openings 74 of an adjacent second row. Near the edge of the protective areas 70 to 73, the through-openings 74 at the end of each second row have a shortened length L as a result of the half-staggered arrangement.

The staggered arrangement of the adjacent rows of through-openings 74 causes in each case two adjacent through-openings 74 to overlap in an overlapping region having a length $L_O$. The length $L_O$ is in the range between 2 mm and 50 mm, in particular between 5 mm and 40 mm, and in particular between 7 mm and 25 mm.

Thanks to the through-openings 74, the protective walls 67, 68 form longitudinal webs 79 as well as corresponding cross webs 80. The longitudinal webs 79 run parallel to the direction of conveyance 12 so as to separate two adjacent rows of through-openings 74 from each other in the direction transverse to the direction of conveyance 12 while the cross webs 80 run transverse to the direction of conveyance 12 so as to separate in each case two adjacent through-openings 74 from each other in the direction of conveyance 12. Seen in the direction of conveyance 12, the longitudinal webs 79 have a length $L_L$ which corresponds to the length of the protective areas 70 to 73. Furthermore, the longitudinal webs 79 have a width $B_L$ in the direction transverse to the direction of conveyance 12. The cross webs 80 on the other hand have a length $L_O$ in the direction of conveyance 12 while the cross webs 80 have a width $B_O$ in the direction transverse to the direction of conveyance 12 which corresponds to the width B. The width $B_L$ of the longitudinal webs 79 and/or the length $L_O$ of the cross webs 80 is in the range of between 0.5 mm and 4 mm, in particular between 0.5 mm to 2 mm, and in particular between 0.5 mm and 1 mm. The width $B_L$ of the longitudinal webs 79 is preferably equal to the length $L_O$ of the cross webs 80.

The width $B_L$ of the longitudinal webs 70 and/or length $L_O$ of the cross webs 80 allow a minimum distance A to be defined between in each case two adjacent through-openings 74, wherein the distance-to-width ratio A/B is such that $0.1 \leq A/B \leq 2$, in particular $0.2 \leq A/B \leq 1.5$, and in particular $0.4 \leq A/B \leq 1$.

In the degassing direction 75, the protective walls 67, 68 have a wall thickness $D_S$, wherein the wall thickness $D_S$ is the range of between 1 mm and 8 mm, in particular between 1 mm and 6 mm, and in particular between 1 mm to 4 mm. The protective element 63 is made of metal.

The at least one filter element 50 has a filter fineness according to ISO 16889 of 1 μm to 10 μm. The at least one filter element 50 further has a thickness $D_F$ which is in the range of 0.1 mm to 2.0 mm, in particular in the range of 0.2 mm to 1.2 mm, and in particular in the range of 0.3 mm to 0.7 mm. The at least one filter element 50 is for instance configured as a metal nonwoven, a plastic nonwoven and/or a sintered metal. When configured as a metal nonwoven or a plastic nonwoven, said nonwoven may be directly reinforced by means of a fabric.

A vacuum generation device 81 comprising a vacuum source 82 is used for degassing the bulk material 2, 3. The vacuum source 82 is for instance configured as a water ring pump. The vacuum source 82 is connected to the central channels 59 to 62 via a respective vacuum line $L_1$ to $L_4$. This is only hinted at in FIG. 1. Each vacuum line $L_1$ to $L_4$ is provided with a respective vacuum control valve $V_1$ to $V_4$. Between the vacuum source 82 and the respective vacuum control valve $V_1$ to $V_4$, each vacuum line $L_1$ to $L_4$ is provided with a respective pressure measuring device $M_1$ to $M_4$. The pressure measuring devices $M_1$ to $M_4$ are connected to a central control device 83 via a respective signal line allowing the measuring signals of the pressure measured in the vacuum lines $L_1$ to $L_4$ by means of the pressure measuring devices $M_1$ to $M_4$ to be transmitted to the control device 83. The vacuum source 82 is driven by a drive motor 84 which is operable by means of the control device 82 as a function of the measuring signals provided by the pressure measuring devices $M_1$ to $M_4$.

In order to clean the vacuum filter insert 32, the processing installation 1 is provided with a flushing device 85 comprising a compressed gas source 86. The compressed gas source 86 is connected to the central channels 59 to 62 via respective flushing lines $D_1$ to $D_4$. This is only hinted at in FIG. 1. In the flushing lines $D_1$ to $D_4$, flushing valves $S_1$ to $S_4$ are arranged.

The vacuum control valves $V_1$ to $V_4$ and the flushing valves $S_1$ to $S_4$ are operable by means of the control device 83 individually and independently of each other, thus allowing the vacuum filter insert 32 in each of the filter areas 43 to 46 or the protective areas 70 to 73 to be acted upon either by a vacuum or a compressed gas or compressed air.

The drive motors 25, 30 are operable by means of the control device 83. The drive device 24 transmits the speed n of the shafts 8, 9 and of the drive motor 25 to the control device 83.

In order to monitor the temperature of the casing 5, a temperature sensor 87 is provided which is in signal communication with the control device 83.

Operation of the processing installation is as follows:

By means of the metering device 28, a mixture of powdery bulk material 2 and granular bulk material 3 is fed to the screw machine 4 via the feed opening 19. The granular bulk material 3 is for instance polymer granules while the powdery bulk material 2 may for instance comprise fillers and/or additives. In order to improve the intake behaviour of the screw machine 4, the bulk material 2, 3 is degassed using the vacuum filter insert 32. To this end, a vacuum is generated by means of the vacuum generation device 81 which is then applied to the central channels 59 to 62. The vacuum filter insert 32 forms a gas-permeable wall portion 76 of the casing bores 6, 7, thus allowing air and/or gas to be drawn out of the bulk material 2, 3, with the result that the intake behaviour of the screw machine is improved.

During degassing, the granular bulk material 3 is held back by the protective element 63, thus preventing the granular bulk material 3 from hitting and damaging the at least one filter element 50. As a result, the granular bulk material 3 is unable to impart kinetic energy to the at least one filter element 50 which might cause damages thereto. The powdery bulk material 2 may pass through the through-openings 74 to the at least one filter element 50 where it is held back. The bulk material particles of the powdery bulk materials 2 are small and have a comparatively low mass so they are unable to cause damages to the at least one filter element 50 due to their kinetic energy.

The first conveyor screw elements 13 carry along the bulk material 2, 3 and in particular wipe it from the vacuum filter insert 32 so that the bulk material 2, 3 is conveyed to the melting and processing zone 17. In the melting and processing zone 17, the bulk material 2, 3 is melted and homogenized by means of the kneading disks 14. The polymer melt produced by melting and homogenizing is conveyed to the pressure build-up zone 18 where it is discharged under pressure via the outlet nozzles 23.

Acting as a granule protection, the protective element 63 on the one hand has a sufficient mechanical intrinsic stability and through-openings 74 which are dimensioned accordingly to be able to hold back the bulk material particles of the granular bulk material 3. On the other hand, the elongated through-openings 74 provide a comparatively large free filter area which ensures that the filter performance of the vacuum filter insert 32 is virtually not impaired.

Each protective area 70 to 73 provides a free filter area formed by the through-openings 74 which corresponds to at least 60%, in particular at least 65%, and in particular at least 70% of the free filter area without the protective element 63.

In the operation of the processing installation 1, the at least one filter element 50 becomes clogged after a certain period of time, with the result that the filter performance of the vacuum filter insert 32 is reduced considerably. When the filter element 50 becomes clogged, a filter cake deposits on the filter element 50 which becomes more and more dense over time. Due to the fact that a compressed gas or compressed air can be applied to each of the filter areas 43 to 46 individually via the central channels 59 to 62, the at least one filter element 50 is cleaned successively, in other words area by area, during the operation of the processing installation 1. For instance, a vacuum is applied to the filter areas 44 to 46 in the manner described above while compressed air is applied to the filter area 43 by closing the vacuum control valve $V_1$ and opening the flushing valve $S_1$. This causes the filter cake, which had deposited on the filter area 43 during operation, to be blast off so that the filter area 43 is clear again. Blasting off the filter areas 43 to 46 is performed successively and at short intervals to prevent the composition of the mixture from being impaired by filter cake fragments. A low pressure in the respective vacuum line $L_1$ to $L_4$ indicates that the at least one filter element 50 in the respective filter area 43 to 46 has exceeded a predefined permissible clogging value, causing the control device 83 to trigger a successive cleaning operation for the at least one filter element 50. The at least one filter element 50 is then for instance cleaned successively in the filter area 43, the filter area 45, the filter area 44 and the filter area 46. The vacuum filter insert 32 is divided into a number of filter areas 43 to 46, thus allowing the filter cake on the filter areas 43 to 46 to be blast off at an early stage so that the quality of the polymer melt to be processed is not impaired while preventing the screw machine 4 from being exposed to unwanted torque variations caused by the filter cake. The successive cleaning of the vacuum filter insert 32 increases the service life of the vacuum filter insert 32, thus allowing for a long service life of the processing installation 1 without interruptions.

When the screw machine 4 is at standstill, for instance as the result of an emergency stop or a regularly scheduled interruption of operation, a compressed gas or compressed air is permanently applied to all filter areas 43 to 46 by means of the flushing device 85. In this manner, all areas of the vacuum filter insert 32 are flushed permanently, thus preventing the at least one filter element 50 from being clogged. This is due to the fact that when the screw machine 4 is at standstill, it is impossible for a gas, which is hot and may be loaded with particles, to flow to the at least one filter element 50 where it might cause bulk material particles deposited there to melt. In other words, the permanent full-area flushing using cold compressed air or cold compressed gas prevents particles, in particular powdery bulk material particles 2, from melting. The volumetric flow rate during flushing is adjustable individually via the flushing valves $S_1$ to $S_4$.

Permanent or preventive flushing of the vacuum filter insert 32 is activated as soon as the speed n has reached or fallen below a lower speed limit $n_U$. Flushing is deactivated again as soon as the speed n has reached or exceeded an upper speed limit $n_O$ after the operation is resumed or, in the case of a permanent interruption of operation, when the casing temperature $T_G$ has reached or fallen below a lower temperature limit $T_U$. Flushing may be resumed again when the casing temperature $T_G$ has reached or exceeded an upper temperature limit $T_O$.

Figure 10:
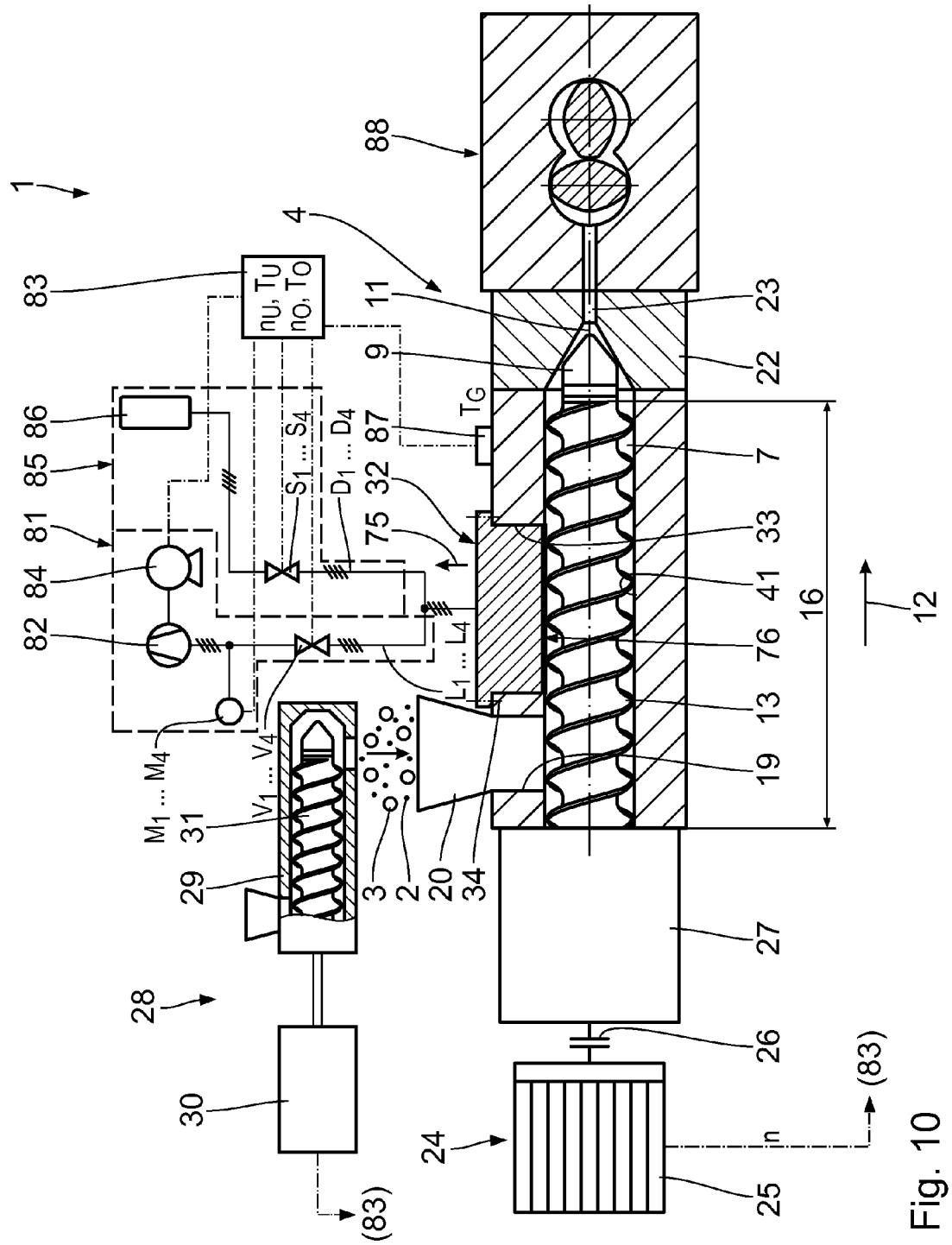
FIG. 10 shows a processing installation for the processing of bulk materials according to a second exemplary embodiment comprising a screw machine configured for side loading.

The following description refers to a second exemplary embodiment of the invention which is described with reference to FIG. 10. The processing installation 1 comprises the screw machine 4 which is used for side loading of another screw machine 88 in which the bulk material 2, 3 is processed. The screw machine 4 is used for mixing and metered supply of the bulk material 2, 3 to the screw machine 88. Corresponding to the first exemplary embodiment, the vacuum filter insert 32 is arranged in the inlet zone 16 of the screw machine 4. The screw machine 4 is only provided with treatment elements in the form of screw elements 13 required for conveying the bulk material 2, 3. Further details concerning the structure and functioning of the processing installation 1 can be found in the description of the preceding exemplary embodiment.

What is claimed is:

1. A screw machine comprising:
   a casing;
   at least one casing bore formed in the casing;
   at least one shaft which is drivable for rotation about an associated axis of rotation and which is arranged in the associated casing bore;
   at least one treatment element for the treatment of a bulk material to be processed which is non-rotationally arranged on the at least one shaft;
   a feed opening for feeding the bulk material into the at least one casing bore; and
   a vacuum filter insert for degassing of the supplied bulk material, wherein the vacuum filter insert is arranged in the casing downstream of the feed opening when seen in a direction of conveyance, the vacuum filter insert being provided with at least one filter element, the vacuum filter insert forming a gas-permeable wall portion which defines the at least one casing bore, wherein a protective element comprising through-openings is arranged upstream of the at least one filter element when seen in a degassing direction, the protective element having at least two separate protective areas comprising through-openings, each protective area being assigned to a central channel.

2. A screw machine according to claim 1, wherein the through-openings are configured in the shape of an elongated hole.

3. A screw machine according to claim 1, wherein the through-openings have a length L and a width B to which applies $2 \leq L/B \leq 100$.

4. A screw machine according to claim 1, wherein the through-openings are arranged in rows.

5. A screw machine according to claim 4, wherein the through-openings are arranged in such a way that their respective central longitudinal axes are aligned with respect to each other in such a way as to form a row.

6. A screw machine according to claim 1, wherein the through-openings of adjacent rows are arranged in a staggered pattern.

7. A screw machine according to claim 1, wherein in each case two adjacent through-openings have a distance A from each other, wherein the ratio of the distance A to a width B of the through-openings is such that $0.1 \leq A/B \leq 2$.

8. A screw machine according to claim 1, wherein the vacuum filter insert has a filter element for each protective area.

9. A screw machine according to claim 1, wherein each central channel is connected to an associated distribution channel.

10. A screw machine according to claim 1, wherein said screw machine has at least two interpenetrating casing bores, which are configured in such a way as to be parallel to each other, and associated shafts comprising closely intermeshing treatment elements, wherein the protective element has a cross-section which is partially in the shape of two adjacent segments of a circular arc so as to be adapted to the at least two casing bores.

11. A method for the processing of bulk materials, the method comprising the following steps:
    providing a screw machine comprising a casing, at least one casing bore formed in the casing, at least one shaft which is drivable for rotation about an associated axis of rotation and which is arranged in the associated casing bore, at least one treatment element for the treatment of a bulk material to be processed which is non-rotationally arranged on the at least one shaft, a feed opening for feeding the bulk material into the at least one casing bore and a vacuum filter insert for degassing of the supplied bulk material, wherein the vacuum filter insert is arranged in the casing downstream of the feed opening when seen in a direction of conveyance, the vacuum filter insert being provided with at least one filter element, the vacuum filter insert forming a gas-permeable wall portion which defines the at least one casing bore;
    supplying bulk material to the at least one casing bore via the feed opening;
    degassing the bulk material via the vacuum filter insert, wherein the vacuum filter insert is flushed with a compressed gas when the screw machine is at standstill, wherein flushing is activated when a predefined lower speed limit of the at least one shaft is reached; and
    processing the bulk material.

12. A method according to claim 11, wherein the bulk material is at least one of granular material and powdery bulk material.

13. A method according to claim 11, wherein the compressed gas used for flushing is compressed air.

14. A method according to claim 11, wherein flushing is deactivated when a predefined upper speed limit of the at least one shaft is reached.

15. A method according to claim 11, wherein flushing is deactivated when a predefined lower temperature limit of the casing is reached.

16. A method according to claim 11, wherein for cleaning, the vacuum filter insert is flushed area by area by means of a compressed gas.

17. A method according to claim 11, wherein a protective element comprising through-openings is arranged upstream of the at least one filter element when seen in a degassing direction which protects the at least one filter element from damages caused by the bulk material during degassing.

18. A processing installation for the processing of bulk material, the processing installation comprising:
    a screw machine comprising a casing, at least one casing bore formed in the casing, at least one shaft which is drivable for rotation about an associated axis of rotation and which is arranged in the associated casing bore, at least one treatment element for treatment of a bulk material to be processed which is non-rotationally arranged on the at least one shaft, a feed opening for feeding the bulk material into the at least one casing bore and a vacuum filter insert for degassing of the supplied bulk material, wherein the vacuum filter insert is arranged in the casing downstream of the feed opening when seen in a direction of conveyance, the vacuum filter insert being provided with at least one filter element, the vacuum filter insert forming a gas-permeable wall portion which defines the at least one casing bore;
    a drive device for rotatably driving the screw machine;
    a vacuum generation device for degassing the bulk material via the vacuum filter insert;
    a flushing device for cleaning the vacuum filter insert; and
    a control device, wherein a protective element comprising through-openings is arranged upstream of the at least one filter element when seen in a degassing direction, wherein the protective element has at least two separate protective areas comprising through-openings, each protective area being assigned to a central channel.

19. A processing installation for the processing of bulk material, the processing installation comprising:
    a screw machine comprising a casing, at least one casing bore formed in the casing, at least one shaft which is drivable for rotation about an associated axis of rotation and which is arranged in the associated casing bore, at least one treatment element for the treatment of a bulk material to be processed which is non-rotationally arranged on the at least one shaft, a feed opening for feeding the bulk material into the at least one casing bore and a vacuum filter insert for degassing of the supplied bulk material, wherein the vacuum filter insert is arranged in the casing downstream of the feed opening when seen in a direction of conveyance, the vacuum filter insert being provided with at least one filter element, the vacuum filter insert forming a gas-permeable wall portion which defines the at least one casing bore;
    a drive device for rotatably driving the screw machine;

a vacuum generation device for degassing the bulk material via the vacuum filter insert;
a flushing device for cleaning the vacuum filter insert; and
a control device, wherein the control device is configured in such a way that the vacuum filter insert is flushed with a compressed gas when the screw machine is at a standstill, wherein flushing is activated when a predefined lower speed limit of the at least one shaft is reached.

\* \* \* \* \*